(12) United States Patent
Balakrishnan et al.

(10) Patent No.: US 10,141,765 B2
(45) Date of Patent: Nov. 27, 2018

(54) SINGLE PIN MOSFET DRIVE AND DISCHARGE FUNCTIONALITY

(71) Applicant: Power Integrations, Inc., San Jose, CA (US)

(72) Inventors: Vikram Balakrishnan, Mountain View, CA (US); Edward E. Deng, Los Altos, CA (US); Roland Sylvere Saint-Pierre, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 157 days.

(21) Appl. No.: 15/418,356

(22) Filed: Jan. 27, 2017

(65) Prior Publication Data

US 2018/0219399 A1 Aug. 2, 2018

(51) Int. Cl.
*H02J 7/00* (2006.01)
*H01R 24/64* (2011.01)
*H02M 1/08* (2006.01)
*H02M 1/32* (2007.01)
*H02M 3/24* (2006.01)
*G06F 13/40* (2006.01)
*H01R 107/00* (2006.01)
*H02M 1/00* (2006.01)

(52) U.S. Cl.
CPC ........ *H02J 7/0081* (2013.01); *G06F 13/4077* (2013.01); *H01R 24/64* (2013.01); *H02J 7/0045* (2013.01); *H02M 1/08* (2013.01); *H02M 1/32* (2013.01); *H02M 3/24* (2013.01); *H01R 2107/00* (2013.01); *H02M 2001/0009* (2013.01)

(58) Field of Classification Search
CPC ........ H02J 7/008; H02J 7/0044; H02J 7/0045; H02J 7/0052; H02J 7/0065; H02J 2007/006
USPC ........................................ 320/140
See application file for complete search history.

(56) References Cited

U.S. PATENT DOCUMENTS

2014/0320075 A1 10/2014 Baurle
2015/0229119 A1 8/2015 Tao et al.
2015/0326008 A1 11/2015 Baurle et al.
(Continued)

FOREIGN PATENT DOCUMENTS

CN 104 881 391 A 9/2015

OTHER PUBLICATIONS

European Patent Application No. 18153369.6—Extended European Search Report dated Jun. 19, 2018, 6 pages.
(Continued)

*Primary Examiner* — Paul Dinh
(74) *Attorney, Agent, or Firm* — Christensen O'Connor Johnson Kindness PLLC

(57) ABSTRACT

A circuit for use with a Universal Serial Bus (USB) socket includes a power converter coupled to receive an input voltage at an input terminal and coupled to provide an output voltage at an output terminal. A transistor is coupled between the output terminal of the power converter and a bus voltage terminal of the USB socket. A USB communication controller is coupled to the USB socket. The USB communication controller includes an output terminal coupled to a control terminal of the transistor. A bleeder circuit is coupled between the output terminal of the USB communication controller and the bus voltage terminal of the USB socket.

18 Claims, 6 Drawing Sheets

(56) References Cited

U.S. PATENT DOCUMENTS

2015/0340890 A1* 11/2015 Yao ................. H02J 7/0042
            320/114
2017/0040817 A1* 2/2017 Hu .................... H02J 7/045

OTHER PUBLICATIONS

"Universal Serial Bus Type-C Cable and Connector Specification", Revision 1.1, Apr. 3, 2015, © 2015 USB 3.0 Promoter Group, 180 pages.

* cited by examiner

SINGLE PIN MOSFET DRIVE AND DISCHARGE FUNCTIONALITY

BACKGROUND INFORMATION

Field of the Disclosure

The present invention relates generally to USB connectors. More specifically, examples of the present invention are related to USB type C connectors.

Background

Electronic devices use power to operate. Power is generally delivered through a wall socket as high voltage alternating current (ac). A common type of interface used for charging electronic devices is a Universal Serial Bus (USB) interface.

Over the years, many types of USB platforms, devices, receptacles, plugs, sockets, connectors, etc., have been developed, which mainly fall under two standards, Standard-A and Standard-B, and are considered as legacy devices. As platform usage models have evolved, usability and robustness requirements have advanced and the existing set of USB connectors were not originally designed for some of these newer requirements. A recently released standard, Type-C, is a new USB connector ecosystem that addresses the evolving needs of platforms and devices while retaining all of the functional benefits of USB that form the basis for this most popular of computing device interconnects. The USB Type-C Cable and Connector Specification (Revision 1.1, Apr. 3, 2015) defines a new receptacle, plug, cable, and detection mechanisms that are compatible with existing USB interface electrical and functional specifications.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
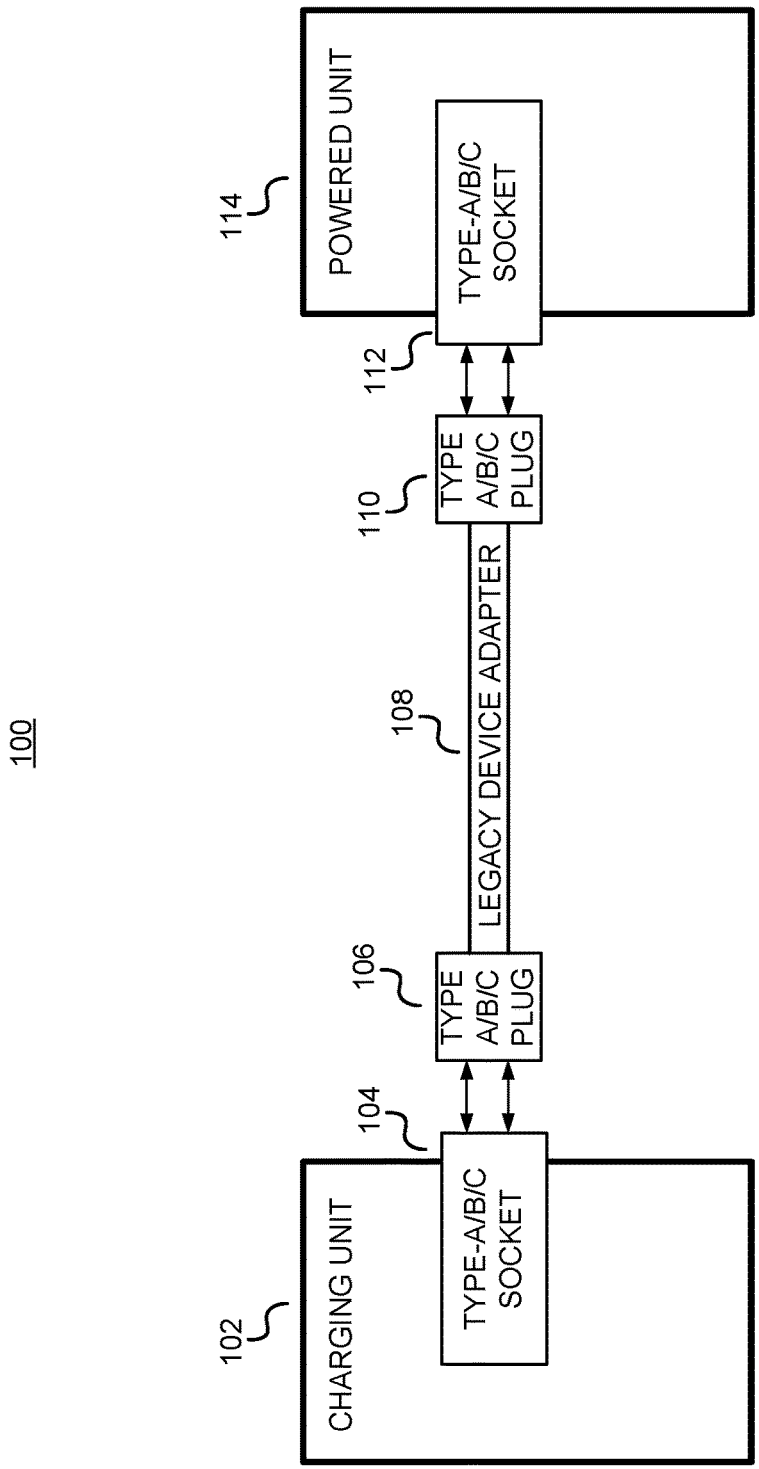
FIG. 1 is a functional block diagram illustrating one example of a typical USB communication system including a USB Type A/B/C charging unit coupled to a USB type A, B, or C powered unit via a USB legacy device adapter.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Furthermore, embodiments/examples in this application refer to different pieces of circuitry responding to a "logic high" or "logic low" signal in a particular way; however, one skilled in the art will appreciate that the same piece of circuitry may be configured to respond the same way to the opposite signal (e.g., a piece of circuitry that turns on in response to a logic high signal, may be configured to turn on in response to a logic low signal or vice versa).

The USB Type-C™, hereafter Type-C, receptacle, plug, and cable provide a smaller, thinner, and more robust alternative to the existing USB 3.1 interconnect (Standard and Micro USB cables and connectors). This new solution targets use in very thin platforms, ranging from ultra-thin notebook PCs down to smart phones where existing Standard-A and Micro-AB receptacles are deemed too large, difficult to use, or inadequately robust. While the USB Type-C interconnect no longer physically differentiates plugs on a cable by being an A-type or B-type, the USB interface still maintains a host-to-device logical relationship. Determination of this host-to-device relationship is accomplished through a Configuration Channel (CC) that is connected through the cable. In addition, the Configuration Channel is used to set up and manage power and Alternate/Accessory Modes. Using the Configuration Channel, the USB Type-C interconnect defines a simplified 5 volt $V_{BUS}$ based power delivery and charging solution that supplements what is already defined in the USB 3.1 Specification. More advanced power delivery and battery charging features over the USB Type-C interconnect are based on the USB Power Delivery Specification. As a product implementation improvement, the USB Type-C interconnect shifts the USB Power Delivery (PD) communication protocol from being communicated over $V_{BUS}$ to being delivered across the USB Type-C Configuration Channel. In general, $V_{BUS}$ provides a path to deliver power between a USB host and a USB device. More specifically, the USB PD communication protocol mandates that power be delivered over $V_{BUS}$ between a charger and a host, or between a charger and a device. The USB PD specification is concerned with the power delivery aspect of the USB Type-C connector. More details about the USB PD communication protocol may be found in the USB Power Delivery Specification.

As will be discussed, examples in accordance with the teachings of the present invention are directed to the power delivery aspect of the USB communication system. According to the USB PD specification, a typical USB system for power delivery may include a power converter to provide an output voltage of 5 V at the VBUS terminal of the connector.

In general, a USB power delivery system may include a new USB Type-C connector coupled to a Type A/B/C device. A typical USB charging system (illustrated below in FIG. 1) may include a charging unit and a powered unit coupled via a USB connector. The charging unit and the powered unit each may have a Type A/B/C socket. For the purpose of this disclosure, it will be assumed that the charging unit is a Type-C unit having a Type-C socket, and that the powered unit is a Type A/B/C unit having a Type A/B/C socket. The USB connector may also be referred to as a receptacle, a connector, an adapter, or a legacy device adapter. One end of the legacy device adapter may have a Type-C plug, which may be connected to the Type-C plug on the Type-C unit, whereas the other end of the legacy device adapter may have a Type-A, a Type-B, or a Type-C plug, which may connect to a Type-A, a Type-B, or a Type-C unit. In one example, the powered unit may be a USB host or a USB device.

The recommended $V_{BUS}$ voltage for a Type-A, a Type-B, or a Type-C unit is approximately 5 V. As a safety precaution, the USB PD specification recommends implementing a $V_{BUS}$ source and $V_{BUS}$ sink feature with the USB Type-C connector. In accordance with the above feature, a $V_{BUS}$ source transistor (MOSFET) and a $V_{BUS}$ sink transistor (MOSFET) are coupled between the output of the power converter and the $V_{BUS}$ terminal. Every time a powered device is connected to the USB connector, the power converter included in the charging unit sources the recommended voltage on the $V_{BUS}$ terminal. In a typical USB communication system, a USB host may assert a $V_{BUS}$ signal. A charge pump, may then output the recommended voltage at the output of the power converter in response to the $V_{BUS}$ signal asserted by host. An internal logic may turn on a source transistor (MOSFET). Every time a powered device is disconnected from the USB connector, the power converter included in the voltage on the $V_{BUS}$ terminal is discharged substantially to zero volts. This is commonly referred to as vSafe0V in the USB PD specification. This is may be achieved by turning on a sink transistor. In general, a USB communication controller typically has two separate terminals in order to implement the source and the sink functionality.

Every time a powered unit is connected to the USB connector, a first terminal or a drive terminal or a source terminal may turn on the source transistor, providing the recommended $V_{BUS}$ voltage. Every time a powered unit is disconnected from the USB connector, a second terminal or a discharge terminal or a sink terminal may turn on the sink transistor, discharging the $V_{BUS}$ voltage to zero volts (vSafe0V). Having two terminals for the purpose of drive and discharge of the $V_{BUS}$ may increase the size and cost of the associated USB circuitry.

Because this device is connected across two high voltage nodes, driving this FET becomes a main difficulty for designers. There are nominally two approaches: use a high side driver to drive an NMOS or use a PMOS FET and take the size/cost penalty in exchange for a simpler driving scheme.

Accordingly, it may be advantageous to have a single terminal capable of both the driving the transistor and discharging the $V_{BUS}$ voltage.

Described herein are methods and apparatus which provide a drive function and a discharge function via a single terminal of a USB communication controller in accordance with the teachings of the present invention. For instance, as will be described in one example, a single drive discharge terminal and a bleeder circuit for use with a USB communication controller is provided. The USB communication controller may use the single drive discharge terminal and the bleeder circuit to turn on or turn off the source transistor. In one example, the USB communication controller may source the $V_{BUS}$ voltage by turning on the source transistor and turning off the bleeder. The USB communication controller may sink the $V_{BUS}$ voltage by turning off the source transistor and turning on the bleeder. In one example, turning on the source transistor may automatically turn off the bleeder, and turning off the source transistor may automatically turn on the bleeder. Furthermore, in one example, the USB communication controller may provide a higher value of voltage (e.g., in the range of 10 V dc) on the single drive discharge terminal when sourcing the $V_{BUS}$ voltage, and may provide a lower value of the voltage on the single drive discharge terminal when sinking the $V_{BUS}$ voltage. In other words, in one example, when a powered unit is coupled to the USB connector, the USB communication controller may provide a higher voltage on the drive discharge terminal to turn on the source transistor and turn off the bleeder. Furthermore, in one example, when a powered device is decoupled from the USB connector, the USB communication controller may provide a lower voltage on drive discharge terminal to turn off the source transistor and turn on the bleeder.

FIG. 1 illustrates a functional block diagram of one example of a USB communication system 100 including a charging unit 102 having a USB Type-A/B/C socket 104, a powered unit 114 having a USB Type-A/B/C socket 112, and a legacy device adapter 108 for coupling the charging unit 102 to the powered unit 114. The legacy device adapter 108 has a Type-C plug 106 at one end that couples to the USB Type-A/B/C socket 104 of the charging unit 102. The other end of the legacy device adapter 108 has a Type-A/B/C plug 110, which can be coupled to a corresponding Type-A/B/C socket 112.

Figure 2:
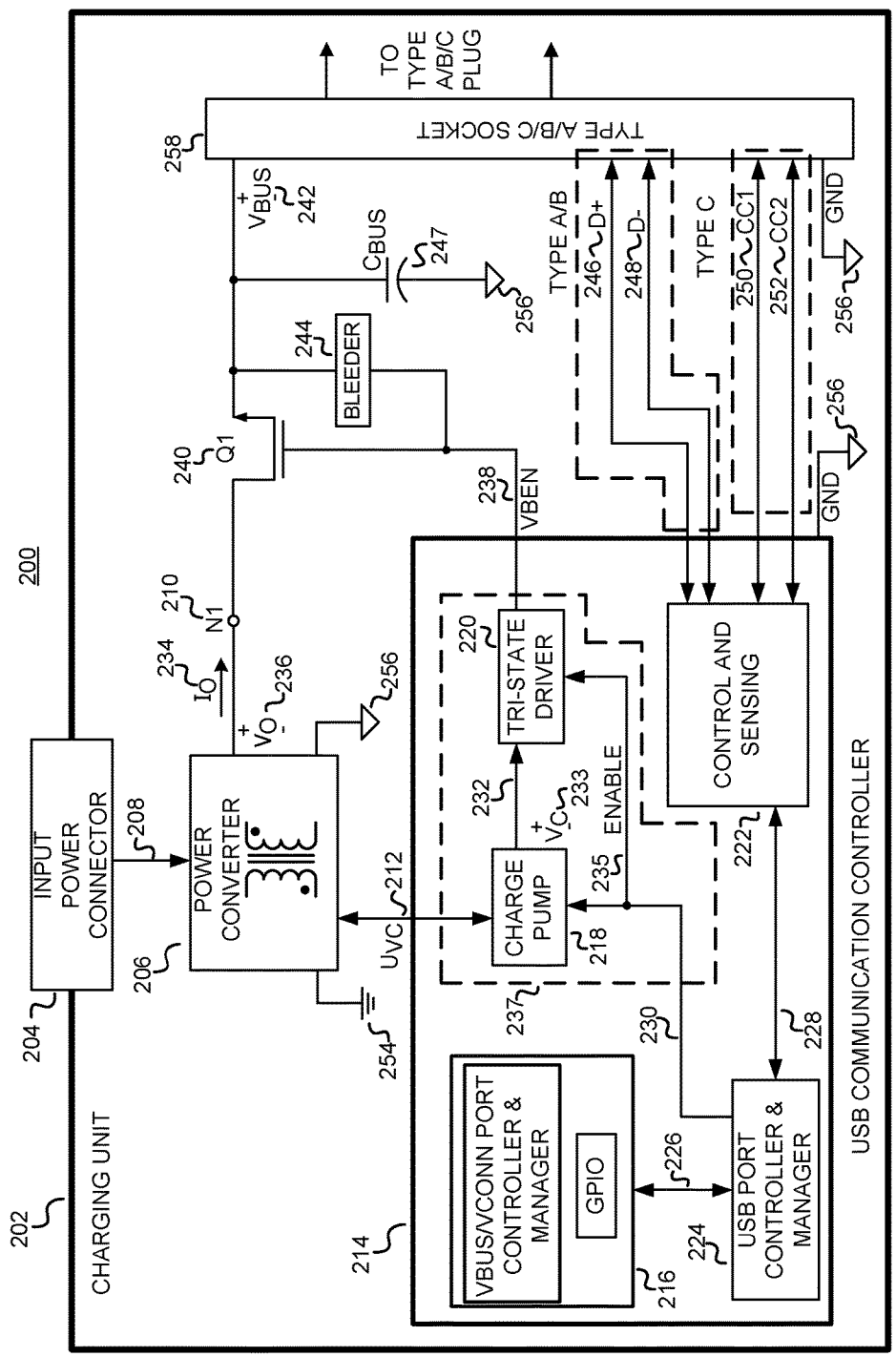
FIG. 2 is a functional block diagram illustrating one example of a charging unit included in an example USB communication system.

FIG. 2 illustrates an example charging unit 202 included in a USB communication system 200. It is appreciated that charging unit 202 of FIG. 2 is similar to the charging unit 102 of FIG. 1, and that similarly named and numbered elements referenced below may therefore be coupled and function similar to as described above. As shown, the charging unit 202 includes an input power connector 204, a power converter 206, a USB communication controller 214, a transistor Q1 240, a bleeder 244, a capacitor $C_{BUS}$ 247, and a Type A/B/C socket 258, hereafter, socket 258. The USB communication controller 214 further includes separate internal blocks, such as a $V_{BUS}/V_{CONN}$ port power controller & manager and general purpose input/output (GPIO) unit 216, a drive discharge control unit 237, a control and sensing unit 222, and a USB port controller & manager 224. As shown, the drive discharge control unit 237 includes a charge pump 218 and a tri-state driver 220 coupled to provide an output VBEN 238 at a single drive discharge terminal coupled to transistor Q1 240 and bleeder circuit 244. In one example, the power converter 206 and the USB communication controller 214 may be integrated in a single integrated circuit package.

The USB communication controller 214 is coupled to exchange communication signals, namely D+ 246, D− 248, CC1 250, and CC2 252, with the socket 258. The socket 258 may be further coupled to a Type A/B/C plug (not shown). In general, the control and sensing unit 222 is coupled to receive signals D+ 246, D− 248, CC1 250, and CC2 252 from the socket 258. In one example if the socket 258 is Type A/B, then the signals received by the control and sensing unit 222 are D+ 246 and D− 248; and if the socket 258 is Type C, then the signals received by the control and sensing unit 222 are CC1 250 and CC2 252. The USB port controller & manager 224 is coupled to the control and sensing unit 222 via a signal 228. The $V_{BUS}/V_{CONN}$ port power control & manage and GPIO unit 216 is coupled to the USB port controller & manager 224 via a signal 226. The charge pump 218 is coupled to receive a signal 230 from the USB port controller & manager 224 and coupled to output a dc voltage $V_C$ 233. The tri-state driver 220 is coupled to receive the dc voltage $V_C$ 233 via a signal 232. The tri-state driver 220 is also coupled to receive a control or enable signal 235 via the USB Port Controller & Manager 224. The dc voltage $V_C$ 233 is positive with respect to the return potential 254.

The input power connector 204 may receive power from a wall socket. The power converter 206 is coupled to receive an ac or a dc input voltage from the input power connector 204 via a signal 208. The power converter 206 is coupled to provide an output voltage $V_O$ 236 and an output current $I_O$ 234 to a load, which in the described example is the transistor Q1 240. The USB communication controller 214 is coupled to exchange a power signal $U_{VC}$ 212 with the power converter 206. The power converter 206, the USB communication controller 214, and the socket 258 are all coupled to the same return reference voltage GND 254. The transistor Q1 240 is coupled to the power converter 206, the USB communication controller 214, and the socket 258. The transistor Q1 240 in the example embodiment is a MOSFET, but may be any other suitable transistor as recommended by the USB Type-C 3.0 specification. The drain of the transistor Q1 240 is coupled to a node N1 210, which is further coupled to the output of the power converter 206. The power converter 206 is coupled to output a regulated dc voltage $V_O$ 236 with respect to the return potential 254, and an output current $I_O$ 234 to the transistor Q1 240 and other associated circuits. The control terminal (gate), hereafter gate, of the transistor Q1 240 is also coupled to receive a voltage signal VBEN 238 from an output terminal of the USB communication controller 214, which in one example the drive discharge terminal output from drive discharge circuit 237.

In one example, the USB Port Controller & Manager 224 may make the control or enable signal 235 logic high to enable or turn on the tri-state driver 220; and logic low to disable or turn off the tri-state driver 220. When the tri-state driver 220 is enabled, the voltage at the signal VBEN 238 is substantially equal to the charge pump voltage $V_C$ 233. When the enable signal 235 of the tri-state driver 220 is logic low, the value of the signal VBEN 238 may be high impedance (high-Z). In one example, when a powered unit is connected to the socket, the charge pump 218 may need to increase the voltage $V_C$ 233 to a higher value $V_{C\_HIGH}$ in order to drive or turn on the transistor Q1 240, and when a powered unit is disconnected from the socket 258, the charge pump 218 may need to decrease the voltage $V_C$ 233 to a lower value $V_{C\_LOW}$ in order to turn off the transistor Q1 240. In one example, the value of $V_{C\_HIGH}$ may be in the range of 10 V, and the value of $V_{C\_LOW}$ may be substantially equal to zero volts. In the described example, the value of $V_{C\_HIGH}$ may be at least 10 V.

When $V_C$ 233 is equal to $V_{C\_HIGH}$, the transistor Q1 240 is turned on, and $V_{BUS}$ 242 is therefore substantially equal to the $V_O$ 236. When $V_C$ 233 is equal to $V_{C\_LOW}$, the transistor Q1 240 is turned off, and $V_{BUS}$ 242 substantially discharges to zero volts through bleeder 244. In one example, before enabling the tri-state driver 220, the USB communication controller 214 may make the output voltage $V_O$ 236 substantially equal to 5 V. In one example, the voltage $V_{BUS}$ 242 may substantially be equal to voltage on the capacitor $C_{BUS}$ 247.

As stated previously, the socket 258 may be coupled to a Type-A, Type-B, or Type-C device via a legacy device adapter (not shown in FIG. 2). The USB communication controller 214 is coupled to identify the device that is coupled at the other end of the legacy device adapter, via the signals CC1 250 and CC2 252. The increase and decrease in the value of the voltage of $V_O$ 236 is realized by the charge pump 218.

In one example, when a powered unit is connected, the USB Port Controller & Manager 224 may make the charge pump voltage $V_C$ 233 equal to $V_{C\_HIGH}$. When a powered unit is disconnected, the USB Port Controller & Manager 224 may make the charge pump voltage $V_C$ 233 equal to $V_{C\_LOW}$. Furthermore, when a powered unit is connected, the USB Port Controller & Manager 224 may enable the tri-state driver 220. When a powered unit is disconnected, the USB Port Controller & Manager 224 may initially enable the tri-state driver 220 while the charge pump voltage $V_C$ 233 equal to $V_{C\_LOW}$ and the voltage $V_{BUS}$ 242 discharges, and then disable the tri-state driver 220 after the voltage $V_{BUS}$ 242 has been discharged substantially to zero volts (vSafe0V). In one example, when a powered unit is connected, the USB Port Controller & Manager 224 may not enable the tri-state driver 220 until the output voltage is $V_O$ 236 is 5 V.

The tri-state driver 220, when enabled, is coupled to transfer the charge pump voltage $V_C$ 233 to the signal VBEN 238. The tri-state driver 220, when disabled, is coupled to output a high-Z value on the signal VBEN 238. Thus it may be easily appreciated that the voltage on signal VBEN 238 will be substantially equal to the charge pump voltage $V_{C\_HIGH}$ when the powered unit is connected. The voltage on signal VBEN 238 will be initially substantially equal to the charge pump voltage $V_{C\_LOW}$ when the powered unit is disconnected, and then later substantially high-Z, until the powered unit is connected again and the output voltage is $V_O$ 236 is 5 V.

When signal VBEN 238 is at $V_{C\_HIGH}$, the transistor Q1 240 is turned on. When signal VBEN 238 is at $V_{C\_LOW}$ or high-Z, the transistor Q1 240 is turned off. Furthermore, a high-Z value of signal VBEN 238 may inhibit the transistor Q1 240 from turning on.

In general, any time a powered unit is connected, the USB communication controller 214 may compare the value of the output voltage $V_O$ 236 to a desired value. If the value of output voltage $V_O$ 236 is lower than the desired value, then the USB communication controller 214 may make the signal VBEN 238 high-Z, and may inhibit the transistor Q1 240 from turning on. In one example, the USB communication controller 214 may make the signal VBEN 238 high when the output voltage $V_O$ 236 is equal to the desired value. In the described example, the desired value of the output voltage may be 5 V. In other examples, the value of the output voltage $V_O$ 236 being compared to may be other 5 V.

When the transistor Q1 240 is on, the voltage $V_{BUS}$ 242 will be substantially equal to the output voltage $V_O$ 236 of the power converter 206. The voltage across the capacitor $C_{BUS}$ 247 is substantially equal to the voltage $V_{BUS}$ 242.

When the transistor Q1 240 is on, the $V_{BUS}$ 242 may substantially charge to the desired output voltage $V_O$ 236. At this time there may be some leakage current through the bleeder 244. When the transistor Q1 240 is off, VBEN 238 is at $V_C$ Low and the $V_{BUS}$ 242 may discharge substantially to 0 V through the bleeder 244. In one example, the discharging of the voltage $V_{BUS}$ 242 is realized by the bleeder 244 in accordance with the teachings of the present invention.

Therefore, $V_{BUS}$ 242 is disconnected from the output terminal of the power converter 206 in response to either one of the lower value of the voltage $V_{C\_LOW}$ or the high impedance signal high-Z on the drive terminal VBEN 238 of the USB communication controller 214 because transistor Q1 240 is turned off. Similarly, $V_{BUS}$ 242 is connected to the output terminal of the power converter 206 in response to the lower value of the voltage $V_{C\_HIGH}$ on the drive terminal VBEN 238 of the USB communication controller 214 because transistor Q1 240 is turned on.

Figure 3:
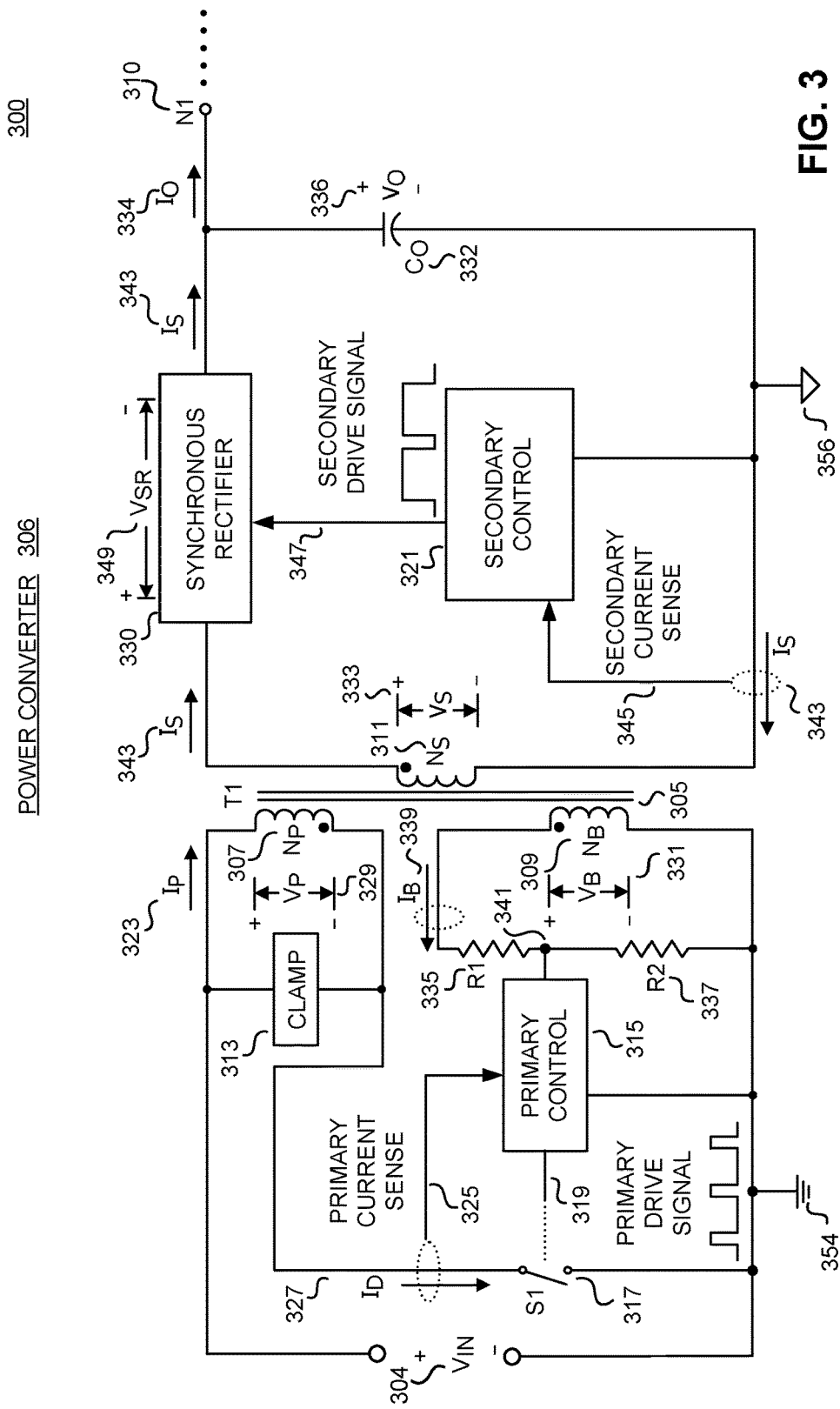
FIG. 3 is a functional block diagram illustrating an example power converter for use with an example USB communication system in accordance with the teachings of the present invention.

FIG. 3 illustrates an example of a power converter 306 that may be included in a USB communication system 300, which may be used in a charging unit. It is appreciated that power converter 306 and USB communication system 300 of FIG. 3 may be examples of power converter 206 and USB communication system 200 of FIG. 2, and that similarly named and numbered elements referenced below may therefore be coupled and function similar to as described above. Specifically, FIG. 3 illustrates an example power converter 306 coupled to receive a dc input voltage $V_{IN}$ 304 and coupled to provide an output voltage $V_O$ 336 at a node N1 310. The example power converter 306 in FIG. 3 is a flyback converter. In other examples, the power converter 306 may be any other type of dc-dc or ac-dc converter. The power converter 306 is a functional block diagram illustrating one example of a dc-dc power converter that receives an input voltage $V_{IN}$ 304 via an input power connector (not shown) to produce an output voltage $V_O$ 336 and an output current $I_O$ 334 at a load. In one described example, the transistor Q1 240 and the other circuitry associated with the socket 258, as described for example in FIG. 2 previously, may be considered as a load. The input power connector (not shown) may be coupled to receive an ac voltage from a wall socket. In an example of an ac-dc power converter, the dc input voltage $V_{IN}$ 304 may be a rectified and filtered ac input voltage.

As shown in the depicted example, power converter 306 further includes an energy transfer element T1 305, a primary winding 307, a secondary winding 311, a bias winding 309, a clamp circuit 313, a primary control circuit 315, a primary switch S1 317, resistors R1 335 and R2 337, a secondary control circuit 321, a synchronous rectifier 330, and an output capacitor $C_O$ 332. Input voltage $V_{IN}$ 304 is positive with respect to an input return 354. Output voltage $V_O$ 336 is positive with respect to an output return 356. The energy transfer element T1 305, may also be a referred to as a coupled inductor. A coupled inductor is sometimes referred to as a transformer. The transformer T1 305 is illustrated as having three windings, a primary winding 307 with NP turns, a secondary winding 311 with Ns turns, and a bias winding 309 with $N_B$ turns. The voltages on the windings are related by the number of turns on each winding. Secondary winding 311 of the transformer T1 305 is galvanically isolated from the primary winding 307 and bias winding 309.

FIG. 3 also illustrates a primary drive signal 319, primary current $I_P$ 323, a primary current sense signal 345, primary voltage $V_P$ 329, a secondary current $I_S$ 343, a secondary voltage Vs 333, a secondary drive signal 347, a synchronous rectifier voltage $V_{SR}$ 349, a secondary current sense signal 345, a bias winding voltage $V_B$ 331, a bias winding current $I_B$ 339, and a primary switch current $I_D$ 327.

As shown in the depicted example, the primary switch S1 317 opens and closes in response to the primary drive signal 319 from the primary control circuit 315. In one example, primary switch S1 317 may be a metal oxide semiconductor field effect transistor (MOSFET). In another example, primary switch S1 317 may be a bipolar junction transistor (BJT). In yet another example, primary switch S1 317 may be an insulated gate bipolar transistor (IGBT) or other suitable switch. The primary control circuit 315 and the primary switch S1 317 may be integrated.

In one example, the primary control circuit 315 generates the primary drive signal 319 in response to the bias voltage signal 341 to turn the primary switch S1 317 on or off. The primary switch S1 317 is closed when it is on, and open when it is off. Primary control circuit 315 may also be responsive to the primary current sense signal 345, which indicates the value of primary switch current $I_D$ 327 in primary switch S1 317. Any of the several ways practiced in the art to sense current in a switch may provide the primary current sense signal 345. In one example, primary drive signal 319 turns primary switch S1 317 off when the primary current sense signal 345 reaches a predetermined value.

The clamp circuit 313 is coupled across the primary winding 307. In operation, all of the energy stored by the primary current $I_P$ 323 through primary winding 307 cannot be transferred to other windings due to imperfect magnetic coupling between primary winding 307 and the other windings of the energy transfer element. In the example power converter 306, energy that cannot be transferred to other windings is received by the clamp circuit 313. The clamp circuit 313 limits the voltage across primary winding 307 to protect the primary switch S1 317 from damage by excessive voltage.

In one example, the primary control circuit 315 controls the switching of the primary switch S1 317 with the primary drive signal 319 in response to a primary current sense signal 345 and a bias voltage signal 341. The bias voltage signal 341 may be the bias winding voltage $V_B$ 331 scaled by the resistors R1 335 and R2 337. In the depicted example, primary control circuit 315 controls the switching of the primary switch S1 317 to regulate the output of the power converter to the desired regulated value. The output may be a voltage, a current, or a combination of a voltage and a current. The example power converter 306 illustrates the primary control circuit 315 regulating the output voltage $V_O$ 336 and an output current $I_O$ 334 at a load (not shown in FIG. 3) via a node N1 310. The capacitor $C_O$ 332 has a sufficient capacitance such that the output voltage $V_O$ 336 is substantially a dc voltage.

The power converter 306 further includes a secondary control circuit 321 that operates a synchronous rectifier 330, while secondary winding 311 delivers the secondary current $I_S$ 343 to the output. In the example shown, the secondary control circuit 321 receives the voltage Vs 333 at secondary winding 311. Secondary control circuit 321 produces a secondary drive signal 347 that controls the synchronous rectifier 330. The primary control circuit 315 controls the primary switch S1 317, in response to the change in the bias winding voltage $V_B$ 331 to control the primary switch S1 317 such that output voltage $V_O$ 336 is regulated to the desired regulated voltage.

Figure 4:
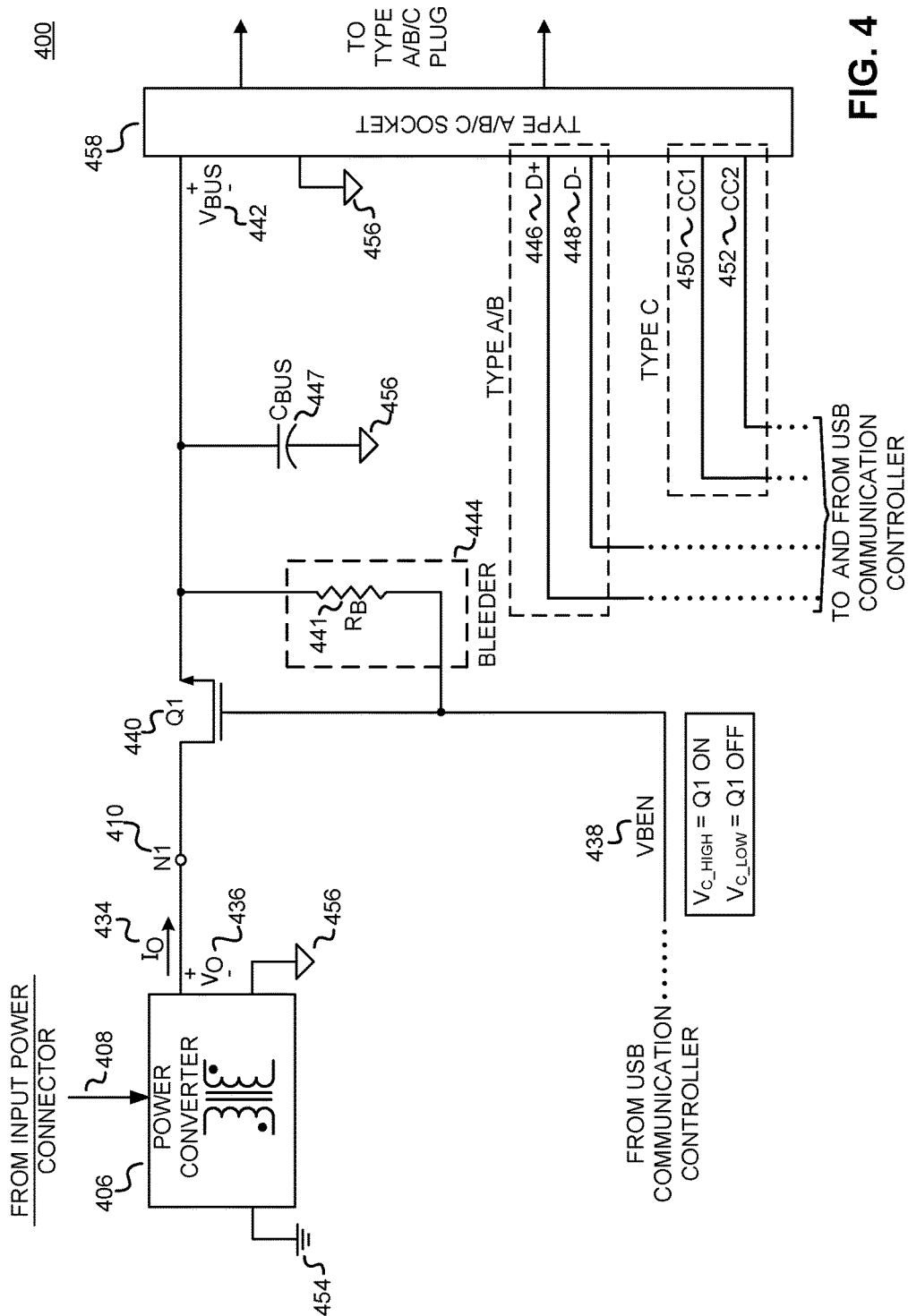
FIG. 4 is a functional block diagram of a portion of a charging unit illustrating an example bleeder circuit in accordance with the teachings of the present invention.

FIG. 4 illustrates a portion of an example charging unit included in a USB communication system as shown in FIG. 2. In particular, FIG. 4 illustrates a portion of an example charging unit (not shown) with the details of an example bleeder circuit in accordance with the teachings of the present invention. As shown in the depicted example, FIG. 4 includes a power converter 406, a transistor Q1 440, a bleeder 444, a capacitor $C_{BUS}$ 447, and a Type A/B/C socket 458, hereafter, socket 458. All of the circuit elements of FIG. 4 are coupled to behave similar to corresponding circuit elements in FIG. 2 and FIG. 3, and therefore similarly named and numbered elements referenced below may therefore be coupled and function similar to as described above. The power converter 406 is coupled to provide an output current $I_O$ 434 and output voltage $V_O$ 436 at a node N1 410. The output of the power converter 406 is coupled to the transistor Q1 440 via the node N1 410. As shown the socket 458 is coupled to exchange signals D+ 446, D− 448, CC1 450, and CC2 452 with the USB communication controller (not shown). In one example if the socket 458 is Type A/B, then the signals exchanged with the USB communication controller are D+ 446 and D− 448; and if the socket 458 is Type C, then the signals exchanged with the USB communication controller are CC1 450 and CC2 452.

Also shown in FIG. 4 is a signal VBEN 438 output from a drive discharge terminal of the USB communication controller (not shown in FIG. 4). The signal VBEN 438 may have a value $V_{C\_HIGH}$, or $V_{C\_LOW}$, or high-z. In one example, the bleeder 444 may include a resistor $R_B$ 441. In other examples, the bleeder 444 may include additional active or passive circuit elements, such as for example, transistors, diodes, and the like. One end of the resistor $R_B$ 441 is coupled to the control terminal (gate) of the transistor Q1 440 and other end of the resistor $R_B$ 441 is coupled to the source terminal of the transistor Q1 440. The gate of the transistor Q1 440 is also coupled to receive a signal VBEN 438 from the USB communication controller (not shown in FIG. 4). In one example, when the voltage on the signal VBEN 438 is equal to $V_{C\_HIGH}$ (charge pump voltage not shown in FIG. 4), the transistor Q1 440 is turned on and $V_{BUS}$ 442 is substantially equal to the desired output voltage $V_O$ 436. At this time some leakage current may flow through the resistor $R_B$ 441, but the amount of leakage current may be minimized by selection of a high value of the resistor $R_B$ 441. In one example, when the voltage at signal VBEN 438 is equal to $V_{C\_LOW}$ (charge pump voltage not shown in FIG. 4), the transistor Q1 440 is turned off, and $V_{BUS}$ 442 substantially discharges to 0 V via the resistor $R_B$ 441. The voltage on the capacitor $C_{BUS}$ 447 is substantially equal to the voltage $V_{BUS}$ 442. In one example, the time taken for the voltage $V_{BUS}$ 442 to discharge to 800 mV is 500 ms.

As explained earlier, when a powered unit (not shown in FIG. 4) is connected to the charging unit, the signal VBEN 438 may have the value $V_{C\_HIGH}$ and turn on the transistor Q1 440. The $V_{BUS}$ 442 is substantially equal to the desired output voltage $V_O$ 436, which in one example may be 5 V.

Figure 5:
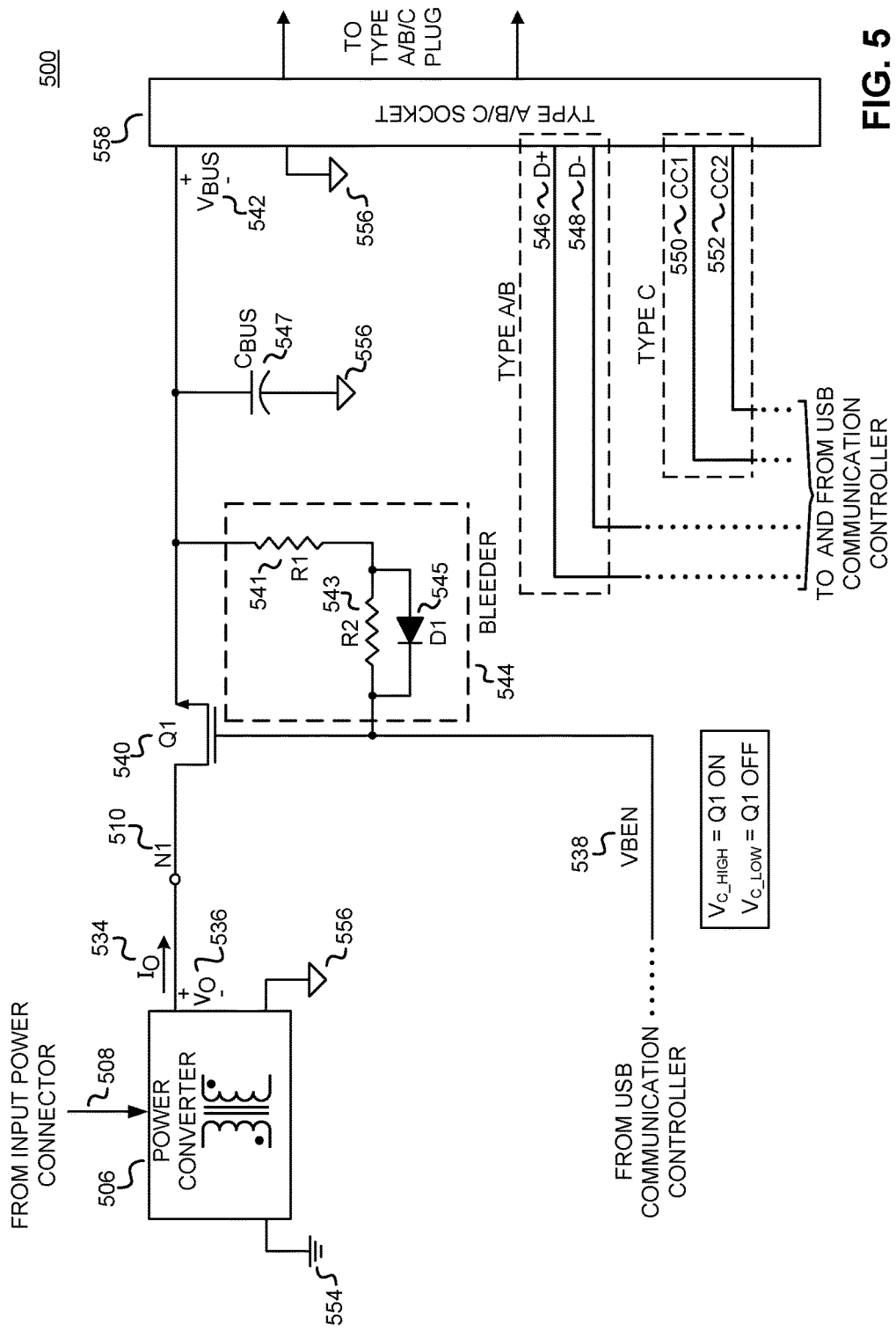
FIG. 5 is a functional block diagram of a portion of a charging unit illustrating another example bleeder circuit in accordance with the teachings of the present invention.

FIG. 5 illustrates a portion of another example charging unit included in a USB communication system according as shown in FIG. 2. Accordingly, similarly named and numbered elements referenced below may therefore be coupled and function similar to as described above. Specifically, FIG. 5 illustrates a portion of an example charging unit (not shown) including another example of a bleeder circuit. Also illustrated in FIG. 5 are a power converter 506, a transistor Q1 540, a bleeder 544, a capacitor $C_{BUS}$ 547, and a Type A/B/C socket 558, hereafter, 558. All of the circuit elements of FIG. 5 are coupled to behave similar to the corresponding circuit elements in FIG. 2 and FIG. 3. The power converter 506 is coupled to provide an output current $I_O$ 534 and output voltage $V_O$ 536 at a node N1 510. The output of the power converter 506 is coupled to the transistor Q1 540 via the node N1 510. As shown the socket 558 is coupled to exchange signals D+ 546, D− 548, CC1 550, and CC2 552 with the USB communication controller (not shown). In one example if the socket 558 is Type A/B, then the signals exchanged with the USB communication controller are D+ 546 and D− 548; and if the socket 558 is Type C, then the signals exchanged with the USB communication controller are CC1 550 and CC2 552. Also shown in FIG. 5 is a signal VBEN 538 from the drive discharge terminal of the USB communication controller (not shown in FIG. 5). The signal VBEN 538 may have a value $V_{C\_HIGH}$, or $V_{C\_LOW}$, or high-z.

In one example, the bleeder 544 includes a first resistor R1 541, a second resistor R2 543, and a diode D1 545. In other examples, the bleeder 544 may include additional active or passive elements such as for example transistors, diodes, and the like. A first end of the resistor R2 543 is coupled to the gate of the transistor Q1 540, and a second end of the resistor R2 543 is coupled to a first end of the resistor R1 541. A second end of R1 541 is coupled to the source terminal of the transistor Q1 540. A first end of the diode D1 545 is coupled to the first end of the resistor R2 543 and a second end of the diode D1 545 is coupled to the second end of the resistor R2 543. The gate of the transistor Q1 540 is also coupled to receive a signal VBEN 538 from the USB communication controller (not shown in FIG. 5). In one example, when the voltage on the signal VBEN 538 is equal to $V_{C\_HIGH}$ (charge pump voltage not shown in FIG. 5), the transistor Q1 540 is turned on, and $V_{BUS}$ 542 is substantially equal to the desired output voltage $V_O$ 536. At this time some leakage current may flow through the resistors R1 541, R2 543, and the diode D1 545. An advantage of the bleeder 544 of FIG. 5 is that the amount of leakage current may be minimized by selection of a higher value of the resistor R1 541. When voltage on the signal VBEN 538 is equal to $V_{C\_LOW}$, the transistor Q1 540 is turned off and $V_{BUS}$ 542 decreases substantially to 0 V via the bleeder 544. In one example, the voltage on the capacitor $C_{BUS}$ is substantially equal to the voltage $V_{BUS}$ 542.

As explained earlier, when a powered unit (not shown in FIG. 5) is connected to the charging unit, the signal VBEN 538 may have the value $V_{C\_HIGH}$ and turn on the transistor Q1 540. At this time the $V_{BUS}$ 542 is substantially equal to the desired output voltage $V_O$ 536, which in one example may be 5 V.

Figure 6:
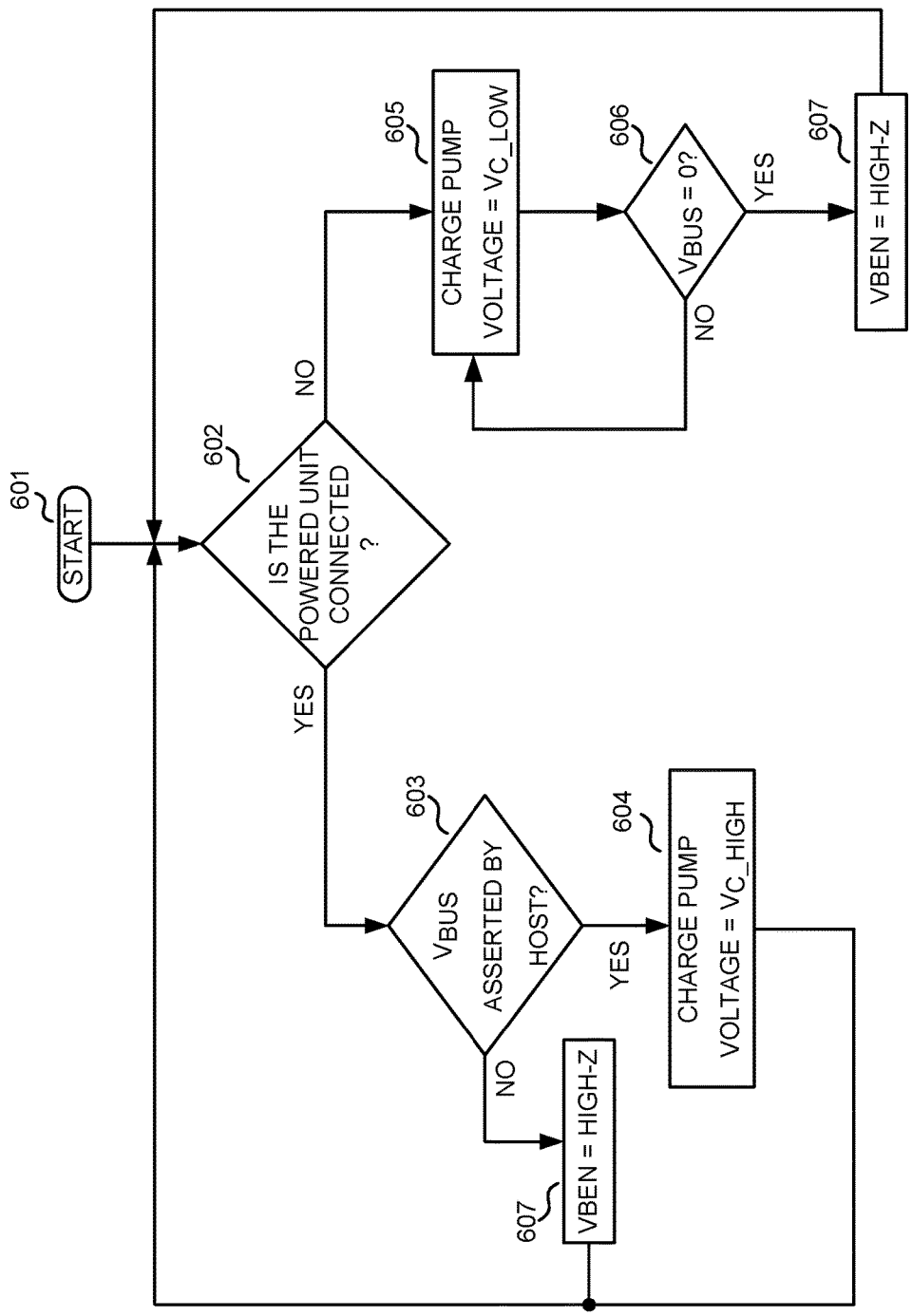
FIG. 6 is an example flow diagram 600 illustrating an example process for charging and discharging a USB connector voltage in accordance with the teachings of the present invention.

FIG. 6 is an example flow diagram 600 illustrating an example process for charging and discharging a USB connector voltage in accordance with the teachings of the present invention.

After starting at process block 601, it may be checked at decision block 602 if the powered unit is connected or not. If the powered unit is connected, then the process moves to decision block 603, otherwise the process moves to process block 605. At decision block 603 it can be checked if a $V_{BUS}$ signal is asserted by a USB host. If yes, then the process may proceed to process block 604, otherwise the process may again proceed back to decision block 607.

At process block 604, the charge pump voltage $V_C$ may be increased to $V_{C\_HIGH}$. Referring briefly to FIG. 2, when the charge pump voltage is at $V_{C\_HIGH}$, the transistor Q1 240 will be turned on, and the voltage $V_{BUS}$ 242 will be substantially equal to the output voltage 236. In other words, the bleeder 244 may be turned off. In one example, when the charge pump voltage is at $V_{C\_HIGH}$, the bleeder may not be turned on. At the end of process block 604, the process may proceed back to decision block 602.

At process block 605, upon detecting that the powered unit is not connected, the charge pump voltage $V_C$ may be decreased to $V_{C\_LOW}$. Referring briefly to FIG. 2, when the charge pump voltage is at $V_{C\_LOW}$, the transistor Q1 240 will be turned off, and the bleeder 244 will be turned on. At this time the voltage $V_{BUS}$ 242 may begin to discharge substantially to zero volts (vSafe0V) through bleeder 244. At the end of process block 605, the process proceeds to the decision block 606.

At decision block 606, it may be checked if the voltage $V_{BUS}$ is equal to zero or not. If the voltage $V_{BUS}$ has not decreased to zero, then the proceeds back to the block 605. If the voltage $V_{BUS}$ has decreased to zero, then the process may proceed to process block 607.

At process block 607, the signal VBEN may be made high-z. Referring briefly to FIG. 2, a high-z value of the signal VBEN 238, may prevent the transistor Q1 240 from turning on.

At the end of process block 607 the process may proceed to decision block 602. When the voltage $V_{BUS}$ substantially reaches zero (indicating that $V_{BUS}$ has fully discharged), then the process may proceed to the beginning of the decision block 602 to check if the powered unit is connected or not.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A circuit for use with a Universal Serial Bus (USB) socket, the circuit comprising
   a power converter coupled to receive an input voltage at an input terminal and coupled to provide an output voltage at an output terminal;
   a transistor coupled between the output terminal of the power converter and a bus voltage terminal of the USB socket;
   a USB communication controller coupled to the USB socket, wherein the USB communication controller includes an output terminal coupled to a control terminal of the transistor; and
   a bleeder circuit coupled between the output terminal of the USB communication controller and the bus voltage terminal of the USB socket.

2. The circuit of claim 1, wherein a first terminal of the transistor is coupled to the output terminal of the power converter, and wherein a second terminal of the transistor is coupled to the bus voltage terminal of the socket.

3. The circuit of claim 1, wherein the bleeder has a first terminal coupled to the control terminal of the transistor, and a second terminal coupled to the second terminal of the transistor.

4. The circuit of claim 2, wherein the control terminal of the transistor is coupled to receive one of a first voltage signal, a second voltage signal, or a high impedance signal from the output terminal of the USB communication controller.

5. The circuit of claim 1, wherein the bus voltage terminal is coupled to receive the output voltage of the power converter when the transistor is turned on, and wherein the bus voltage terminal is coupled to substantially discharge to zero volts through the bleeder circuit when the transistor is turned off.

6. The circuit of claim 1, wherein the controller comprises a charge pump coupled to a tri-state driver, wherein the tri-state driver is further coupled to the output terminal of the USB communication controller to output a drive signal.

7. The circuit of claim 6, wherein the charge pump is coupled to output a voltage to an input of the tri-state driver.

8. The circuit of claim 6, wherein the tri-state driver is coupled to receive a control signal, wherein the tri-state driver is turned on when the control signal is a logic high, and wherein the tri-state driver is turned off when the control signal is logic low.

9. The circuit claim 8, wherein the tri-state driver is coupled to output a charge pump voltage on the drive signal at the output terminal of the USB communication controller when the tri-state driver is turned on, and wherein the tri-state driver is coupled to output the high impedance signal at the output terminal of the USB communication controller when the tri-state driver is turned off.

10. The circuit of claim 9, wherein the transistor is coupled to be turned on and off in response to the drive signal, and wherein the transistor is coupled to be turned off in response to the high impedance signal.

11. The circuit of claim 9, wherein the drive signal is coupled to turn the transistor on and off in response to a higher value of the charge pump voltage, and wherein the bus voltage terminal is coupled to substantially discharge to zero volts through the bleeder circuit in response to a lower value of the charge pump voltage.

12. The circuit of claim 1, wherein the bleeder circuit comprises a resistor.

13. A method of charging a bus voltage terminal of a USB connector, comprising:
   turning on a transistor coupled between an output terminal of a power converter and the bus voltage terminal of the USB socket in response to a higher value of a voltage on a drive terminal of a controller, wherein a control terminal of the transistor is coupled to receive the higher value of voltage from the drive terminal;
   turning off the transistor in response to a lower value of the voltage on the drive terminal of a controller, wherein the control terminal of the transistor is coupled to receive the lower value of voltage from the drive terminal;
   discharging the bus voltage terminal of the USB socket through a bleeder circuit coupled between the bus voltage terminal of the USB socket and the drive terminal of the controller in response to the lower value voltage on the drive terminal; and turning off the transistor in response to a high impedance signal on the drive terminal of the controller after the bus voltage terminal of the USB socket has been discharged.

14. The method of claim 13, wherein the bus voltage terminal of the USB socket is disconnected from the output terminal of the power converter in response to either one of the lower value of the voltage or the high impedance signal on the drive terminal of the controller.

15. The method of claim 13, wherein the bus voltage terminal of the USB socket is connected to the output terminal of the power converter through the transistor in response to the higher value of the voltage on the drive terminal of the controller.

16. The method of claim 13, further comprising checking if a powered unit is connected to the USB socket.

17. The method of claim 16, wherein said turning on the transistor coupled between the output terminal of the power converter and the bus voltage terminal of the USB socket occurs in response to the powered unit being connected to the USB socket.

18. The method of claim 16, wherein said turning off the transistor coupled between the output terminal of the power converter and the bus voltage terminal of the USB socket occurs in response to the powered unit being disconnected to the USB socket.

* * * * *